Feb. 2, 1971  T. D. DUDDERAR ET AL  3,559,473
APPARATUS AND METHOD FOR TENSION-COMPRESSION
TESTING OF THIN SHEETS OF MATERIAL
Filed Sept. 29, 1969
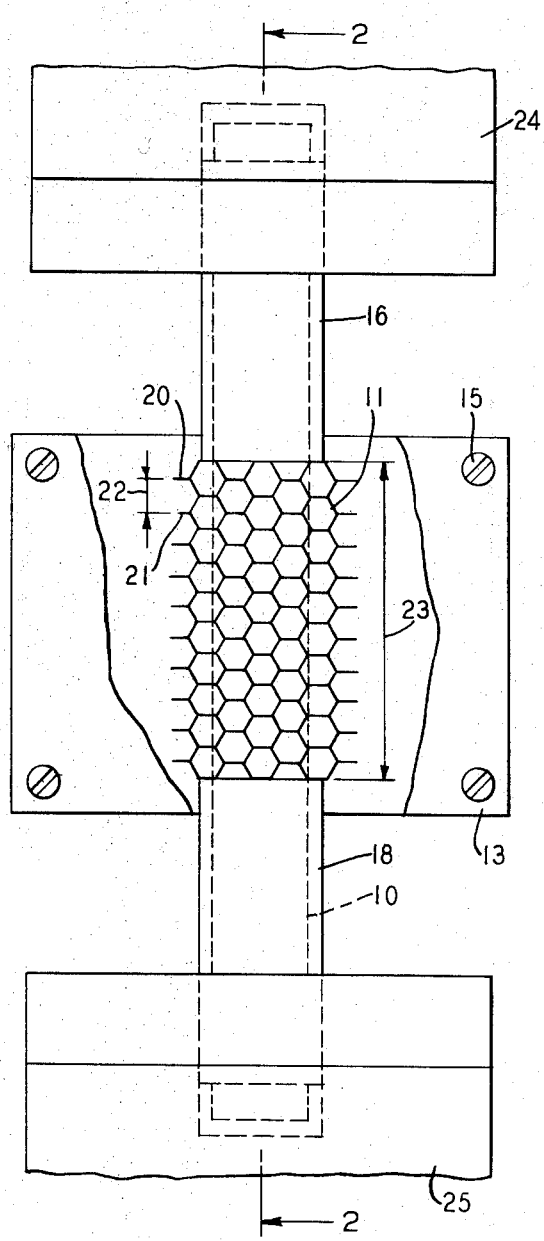
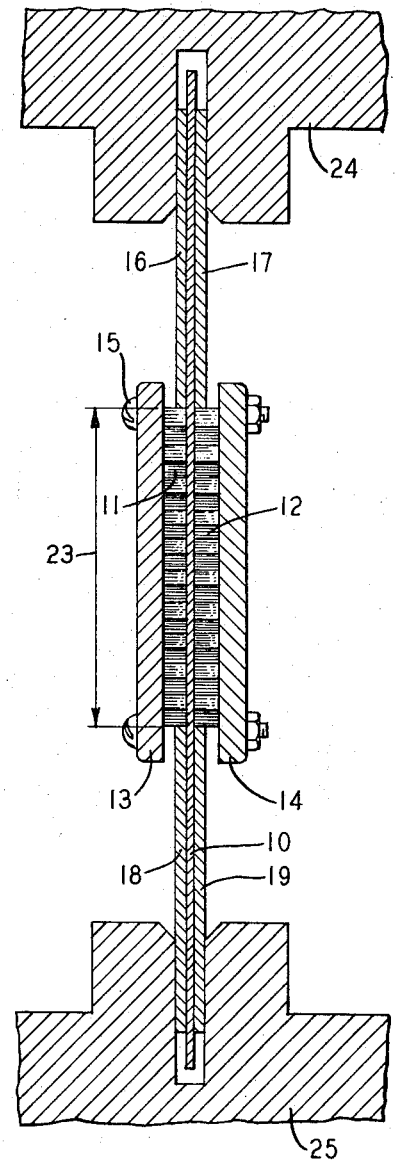
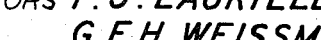
INVENTORS T. D. DUDDERAR
P. J. LAURIELLO
G. F. H. WEISSMANN
BY
ATTORNEY United States Patent Office 3,559,473
Patented Feb. 2, 1971

3,559,473
APPARATUS AND METHOD FOR TENSION-COMPRESSION TESTING OF THIN SHEETS OF MATERIAL
Thomas D. Dudderar, Madison, Philip J. Lauriello, North Plainfield, and Gerd F. H. Weissmann, Florham Park, N.J., assignors to Bell Telephone Laboratories, Incorporated, Murray Hill, N.J., a corporation of New York
Filed Sept. 29, 1969, Ser. No. 861,754
Int. Cl. G01n 3/04
U.S. Cl. 73—103                               8 Claims

ABSTRACT OF THE DISCLOSURE

The buckling of a thin sheet of material subjected to compressive stresses, such as encountered in cyclic fatigue testing, is eliminated by mounting the sheet between two layers of honeycomb material having anisotropic stiffness properties. The honeycomb material effectively reduces the critical buckling length of the sheet without introducing significant restraints on lateral expansion of the thin sheet or on the strain rates which may be used.

BACKGROUND OF THE INVENTION

(1) Field of the invention

This invention relates to apparatus and methods for tension-compression testing of material and more particularly to apparatus and methods for tension-compression testing of thin sheets of material.

(2) Description of the prior art

Thin sheet materials are now in widespread use in such diverse applications as aircraft and missile structures and in thin film and integrated circuit hardware. In such application knowledge of the mechanical properties of the thin sheets of material is required. Specifically, it is often desirable to know the compressive stress-strain properties or the cyclic fatigue properties of the thin sheets. The properties of such thin sheets are not necessarily the same as the bulk properties or properties of a thick piece of material of identical composition. The manufacturing processes such as rolling may introduce residual stresses which have a markedly different effect on thin sheets than on thicker pieces of the material.

A major problem in obtaining compressive stress-strain data on thin sheets of material is the tendency of such thin sheets to buckle under very small compressive loads. The thin sheet fails from instability or buckling before any significant compressive stress-strain data can be obtained. Thus a common practice has been to approximate or extrapolate the compressive stress-strain properties from a knowledge of the tensile properties. This practice of approximation is unsatisfactory for certain materials and in the determination of certain properties, such as cyclic fatigue properties. Consequently, actual compressive or cyclic stress-strain data is required in such circumstances. Efforts to obtain compressive stress-strain data by reducing the length of the test specimen to some value less than the critical length for buckling have met with little success. For such very short specimens the end conditions introduce unacceptable errors into the results.

Many types of apparatus and many methods have been devised to obtain actual compressive stress-strain data. A summary of various methods and apparatus is given in the Journal of the Aeronautical Sciences—November 1946, pages 569 to 580. In general, the thin sheet to be tested is placed between supports to prevent buckling under compressive loads. Various types of supports such as solid lubricated guides, grooved guides, and rollers are used. None of these presently used methods and apparatus are completely satisfactory. Some of the apparatus is relatively complicated. Most of the apparatus introduces a considerable amount of friction between the apparatus and specimen thereby causing errors in the stress-strain data. Additionally, most of the presently used apparatus is quite rigid and thus there is undesirable restraint to lateral expansion of the specimen thin sheet. One further disadvantage is that most of the apparatus will not permit significant variation in the strain rates which is the desirable for testing strain rate dependent materials. Similarly, the frequencies that may be used in cyclic fatigue testing are limited by the presently used apparatus.

Accordingly, it is an object of this invention to improve the apparatus and method for making compressive stress-strain tests of thin sheets of material to eliminate buckling of the thin sheet and undesirable forces such as friction and restriction on lateral expansion of the specimen.

Another object of the invention is to improve the apparatus for making stress-strain tests of thin sheets of material to permit testing over a wide range of strain rates and cyclic test frequencies.

A still further object is to improve the apparatus for conducting compressive stress-strain testing of thin sheets of material to make such apparatus useful as production testing apparatus.

SUMMARY OF THE INVENTION

The foregoing objects and others are achieved in accordance with the principles of the invention through the use of a honeycomb material to support the thin sheet specimen. The thin sheet of material to be tested is sandwiched between layers of honeycomb material having anisotropic strength properties. The honeycomb material is stiff in the direction perpendicular to the axial compressive stress being applied to the thin sheet. In essence the honeycomb material reduces the thin sheet to a multiple of smaller sheets having a length equal to the height of the honeycomb cell. This length is less than the critical length for buckling. Thus the thin sheet is prevented from buckling under the compressive load. The honeycomb has negligible strength or stiffness in a direction parallel to the direction of the compressive stress. Thus the honeycomb material introduces no friction. Because of the limited area of contact, it offers little restraint on the lateral expansion of the specimen thin sheet. Additionally the honeycomb is very simple to utilize and may be used over a wide range of strain rate or cyclic test frequencies. Also, the apparatus may be utilized with the commonly used testing machines.

BRIEF DESCRIPTION OF THE DRAWING

The invention may be more fully comprehended from the following detailed description and accompanying drawing in which:

FIG. 1 is a front elevation view of the thin sheet specimen mounted in the honeycomb test apparatus; and FIG. 2 is a side elevation view of the apparatus of FIG. 1.

DETAILED DESCRIPTION

As shown in FIG. 2 the thin sheet specimen 10 is sandwiched between two sheets or layers of honeycomb material 11 and 12. The honeycomb sheets 11 and 12 might advantageously be made of fiber glass. The honeycomb sheets 11 and 12 are aligned so that the parallel sides 20 and 21 of the cell structures shown in FIG. 1 are perpendicular to the direction of the compressive stress. The honeycomb layers 11 and 12 are held against the specimen 10 by two retaining members 13 and 14. Members 13 and 14 might be made of any desired material of proper rigidity and strength. The members 13 and 14 might advantageously be sheets of Plexiglas to allow observation of the specimen 10 and honeycomb sheets 11 and 12 during the test. The retaining members are joined by bolts or screws of which bolt 15 is typical. The bolt 15 may be adjusted to apply any desired retaining force to the honeycomb sheets 11 and 12. The length 23 of the honeycomb material is the same as the length of the test section of the specimen 10. End plates 16, 17, 18, and 19 prevent the end portions of the specimen 10 which are between the test section and the retaining grips 24 and 25 respectively of the test machine from buckling. These portions of the specimen 10 are often made stronger and more rigid than the test section.

The honeycomb sheets 11 and 12 exhibit very high strength or stiffness properties in a direction perpendicular to a major surface of the test specimen 10, i.e., in a direction perpendicular to the applied stress. The stiffness of the honeycomb sheets 11 and 12 in the specified direction essentially reduces the test specimen 10 to a multiple of short specimens having a length equal to the height 22 of a honeycomb cell, i.e., the distance between the parallel sides 20 and 21 of the cell structure. The end conditions of the short specimens thus created are equivalent to a cantilever beam pinned at both ends. Thus the test specimen 10 does not buckle when a comprehensive stress is applied because the length of each of the short specimens is less than the critical length for buckling. By varying the size of the honeycomb cell structure, the critical length for buckling of the short specimens is likewise varied. Thus an optimum cell size, depending upon such factors as the stiffness of the particular material, may be chosen for any test specimen 10.

The strength or stiffness of the honeycomb sheets 11 and 12 is negligible along the long axis of the test specimen 10, i.e., in a direction parallel to the direction of the applied compressive stress. This is especially true with the cell orientation shown in FIG. 1. Thus the honeycomb sheets 11 and 12 offer negligible resistance to the extension or compression of the specimen 10. In essence the honeycomb structure moves with the specimen 10 during testing, thus no frictional force is introduced between the specimen 10 and the test apparatus. At the same time the limited area of contact between the honeycomb and the specimen permits most of the specimen to expand laterally during compression. This substantially eliminates the undesirable lateral constraint condition which arises in other methods in response to Poisson type cross effects.

The honeycomb sheets 11 and 12 may be used over a wide range of strain rates and frequencies in a cyclic tension-compression fatigue test. The apparatus may be quickly mounted and utilized to test a thin sheet specimen. Thus the apparatus could be used as production test apparatus for thin sheet material. The honeycomb material is inexpensive, thus the optimum cell size can be utilized for any test. A further advantage of the honeycomb structure is that the open cell structure of the material permits the attachment of gauges to the specimen at many locations without altering the apparatus in any manner.

The apparatus may be used to test sheets of different thicknesses. As previously mentioned, the size of the honeycomb cell structure may be optimized with respect to type of material being tested and the thickness of the test specimen. The apparatus may be utilized with any commonly used test machine such as a universal test machine.

It is to be understood that the embodiment of the apparatus and method for testing thin sheets of material described herein is merely illustrative of the principles of the invention. Various modifications thereto may be made by those skilled in the art without departing from the spirit and scope of the invention.

What is claimed is:

1. Apparatus for making tension-compression tests of a thin sheet of material comprising, in combination, first and second supporting members between which said sheet is mounted, each of said members having anisotropic stiffness properties for simultaneously providing to said sheet substantial resistance to buckling and negligible resistance to lateral expansion, and means for maintaining each of said supporting members in contact with said sheet, whereby said sheet is maintained in a stable configuration during said tension-compression test.

2. Apparatus in accordance with claim 1 wherein said first and second supporting members comprise first and second sheets of honeycomb material.

3. Apparatus in accordance with claim 3 wherein said honeycomb material comprises a fiber glass honeycomb structure.

4. Apparatus in accordance with claim 2 wherein said maintaining means comprises first and second sheets of rigid transparent material.

5. Apparatus in accordance with claim 4 further including adjustable means for connecting said first and second sheets of transparent material whereby a variable force may be applied to said first and second sheets of honeycomb material to insure contact with said thin sheet.

6. Apparatus in accordance with claim 1 including means for joining the ends of said thin sheet to a test machine for applying a test force to said thin sheet.

7. Apparatus in accordance with claim 6 wherein said joining means comprises rigid plates between which said sheet is mounted for supporting the ends of said thin sheet.

8. The method of compressive stress-strain testing of a thin sheet of material comprising the step of mounting said sheet between first and second layers of honeycomb material, each of said layers simultaneously providing substantial resistance to buckling of said sheet and negligible resistance to lateral expansion of said sheet, maintaining each of said layers of honeycomb in contact with said thin sheet, and applying a compressive stress to said sheet whereby the stress-strain characteristic of said sheet in compression may be determined.

References Cited

UNITED STATES PATENTS 2,368,900   2/1945   Templin _____ 73—103

RICHARD C. QUEISSER, Primary Examiner

M. SMOLLAR, Assistant Examiner

U.S. Cl. X.R.

73—94